(No Model.)
G. B. AUSTIN.
TENSION DEVICE FOR CHECK ROW WIRES.
No. 554,969. Patented Feb. 18, 1896.
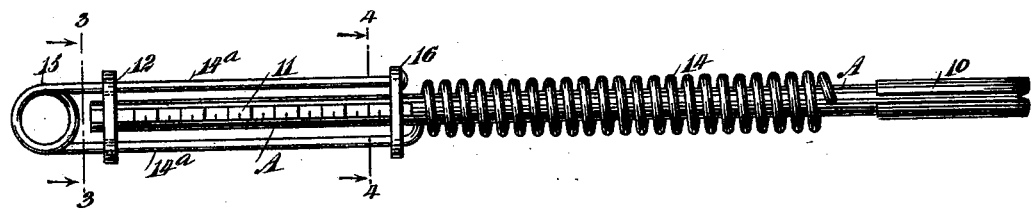
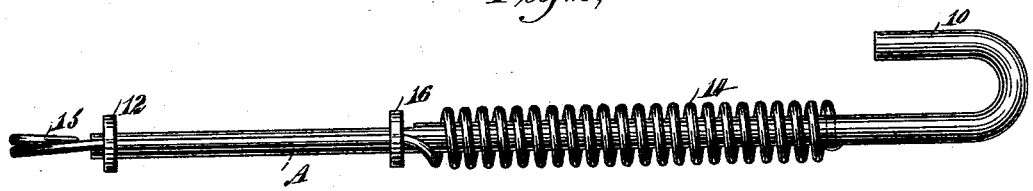
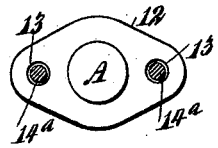
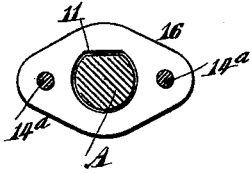
WITNESSES:
Edward Thorpe.
INVENTOR
G. B. Austin
BY Munn & Co
ATTORNEYS.

United States Patent Office.

GEORGE BENHAM AUSTIN, OF DUNDAS, MINNESOTA.

TENSION DEVICE FOR CHECK-ROW WIRES.

SPECIFICATION forming part of Letters Patent No. 554,969, dated February 18, 1896.

Application filed October 25, 1895. Serial No. 566,844. (No model.)

*To all whom it may concern:*

Be it known that I, GEORGE BENHAM AUSTIN, of Dundas, in the county of Rice and State of Minnesota, have invented a new and Improved Tension Device for Check-Rower Wires, of which the following is a full, clear, and exact description.

My invention relates to an improvement in tension devices particularly adaptable for the guide-wires of check-rowers, and the object of the invention is to provide a device by means of which the said wires may be stretched at a uniform tension and whereby the tension at which the wires may be placed by the device may be determined in a measure by a scale forming a portion of the device, thereby enabling the check-row wires to be stretched to practically the same degree, no matter how often the wire may be shifted or whether it is carried longitudinally or transversely of the field.

The invention consists in the novel construction and combination of the several parts, as will be hereinafter fully set forth and pointed out in the claims.

Reference is to be had to the accompanying drawings, forming a part of this specification, in which similar characters of reference indicate corresponding parts in all the figures.

Figure 1 is a plan view of the device. Fig. 2 is a side elevation of the same. Fig. 3 is a transverse section taken on the line 3 3 of Fig. 1, and Fig. 4 is a section taken substantially on the line 4 4 of Fig. 1.

In carrying out the invention the body of the device consists of a bar A of suitable dimensions, and this bar at one of its ends is preferably bent upon itself to form a hook 10, and the hook is usually a twin-hook, in order that the wire may, if desired, be passed between the members of the hook and secured to a short wire, a stout stick, or its equivalent, the latter being then placed transversely within the hook, or the wire to be stretched may have a loop formed therein and the loop passed over the hook. A scale 11, in inches, is produced upon or is attached to one face of the body-bar at the end opposite to that provided with the hook 10, and the said scale is preferably made on the upper face of the bar. At the extremity of the bar upon which the scale is made a guide-yoke or washer 12 is firmly secured, and the said washer is preferably of an elongated form, being provided with an opening 13 at or near each of its ends, as illustrated in Fig. 3.

A spring 14 is coiled around the body-bar, and one of its ends is secured to the said bar near the hook 10. The wire of the spring at its opposite end is carried parallel with one side of the body-bar to or beyond the end, and at that point it is bent upon itself to form an eye 15, and the said wire is then carried in direction of the hook 10 parallel with the opposite side of the body-bar, and is secured to one end of the loose washer or yoke 16, which washer or yoke is held to slide on the body-bar and over its scale. The other strand of the wire is likewise secured to this movable washer or yoke 16, so that when the spring is expanded or when the spring is contracted the yoke or washer 16 will move over the scale and indicate in inches the amount of slack in the wire taken up by the device.

In operation the stake to which the guide-wire of the check-rower is usually attached is made to receive the eye 15 of the device, and one end of the wire to be stretched is attached to the body-bar at the hook 10, as heretofore described, and prior to fastening the wire to the hook 10 of the body-bar the wire is placed under tension by drawing it through the hook until all the slack is taken up and the wire is as taut as desired. The wire is then secured to the hook and the marking-washer 16 in passing over the scale upon the expansion of the spring 14 will indicate the number of inches that the wire has been taken up, enabling the operator when the wire is to be again stretched to take up the same amount, and the wire thus being always under the same tension when in use will insure the rows being in proper alignment.

The device is exceedingly simple and is likewise durable and economic and readily manipulated. Both the hook 10 and the eye 15 are virtually keepers, and the washer 16 sliding over the scale is practically a pointer.

Having thus described my invention, I claim as new and desire to secure by Letters Patent—

1. In a tension device, a body-bar provided with a hook at one of its ends and having a scale produced upon one of its faces, a spring having one terminal secured to the said body, the spring being coiled around the same, the free end of the said spring being carried around both sides of the end of the body-bar at which the scale is produced, the free end of the spring having an eye, and a pointer attached to the free end of the spring, and adapted to move over the aforesaid scale, as and for the purpose specified.

2. In a tension device for the purpose described, the combination, with a body-bar having a hook at one of its ends and provided at the opposite end with a fixed washer and a scale, of a spring secured to the body-bar near its hook end, the free end of the said spring being carried parallel with opposite sides of the body-bar around the scale end, having the scale, the said free end having an eye, the extensions of the spring being loosely passed through the washer that is fixed to the body-bar, and a pointer having sliding movement on the body-bar over the scale and secured to the free end of the spring, as and for the purpose set forth.

3. In a tension device for the purpose described, the combination, with a body-bar having a twin hook formed at one of its ends and a scale produced at the opposite end, and a washer attached to the scale end of the said body-bar, of a spring secured at one of its ends to the body-bar near the aforesaid hook, the said spring being coiled around the bar, the free end of the spring being extended parallel with both sides of the scale portions of the bar and loosely passed through the fixed washer, the free end of the spring having an eye formed therein, and a washer loosely mounted on the bar at the scale portion thereof and attached to the extension of the said spring, as and for the purpose set forth.

4. A tension device for the guide-wires of check-rowers, comprising a body-bar having a keeper at one end, and a spring attached to the said bar, having its ends extended around the opposite ends of the bar and formed with an eye, as and for the purpose specified.

5. In a tension device for the guide-wires of check-rowers, a body-bar provided with a keeper at one end and a scale at the opposite end, an eye independent of the body-bar, a spring connected with the said eye and attached to the body-bar, and a pointer controlled by the movement of the spring, being adapted to move over the scale of the body-bar, as and for the purpose specified.

6. The combination of a body-bar, having at one end means for attaching a wire and at the opposite end a scale, a retractile spring having one end fixed to the body-bar, the remaining end of the spring being extended adjacent to the scale, and an indicator fixed to said remaining end of the spring, and co-operating with the scale, substantially as described.

7. The combination of a body-bar having a scale formed thereon, a retractile spring having one end fixed to the body-bar and having the remaining end movable in the vicinity of the scale, a guide rigid on the body-bar and through which said remaining end moves, and an indicator fixed to said remaining end and co-operating with the scale, substantially as described.

8. The combination of the body-bar having a scale formed thereon, a coil-spring embracing the body-bar and having one end fixed thereto, the remaining end of the coil-spring being movable in the vicinity of the scale, and an indicator carried by said remaining end and co-operating with the scale, substantially as described.

GEORGE BENHAM AUSTIN.

Witnesses:
A. P. GRESS,
Mrs. E. L. AUSTIN.